United States Patent
Schenten et al.

(10) Patent No.: US 8,905,475 B2
(45) Date of Patent: Dec. 9, 2014

(54) MODULAR SEAT ASSEMBLY FOR A VEHICLE

(75) Inventors: Steven J. Schenten, Oxford, MI (US); Sumit Mathur, Troy, MI (US); D. Scott Bittinger, Fenton, MI (US); Nicol Margot Albanese, Plymouth, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 17 days.

(21) Appl. No.: 13/159,691

(22) Filed: Jun. 14, 2011

(65) Prior Publication Data

US 2012/0319449 A1    Dec. 20, 2012

(51) Int. Cl.
*B60N 2/015* (2006.01)
*B60N 2/68* (2006.01)
*B60N 2/22* (2006.01)
*B60N 2/28* (2006.01)
*B60N 2/36* (2006.01)

(52) U.S. Cl.
CPC .............. *B60N 2/2245* (2013.01); *B60N 2/015* (2013.01); *B60N 2/2893* (2013.01); *B60N 2205/35* (2013.01); *B60N 2/36* (2013.01); *B60N 2/686* (2013.01); *B60N 2/688* (2013.01); *B60N 2/68* (2013.01); *B60N 2/366* (2013.01)
USPC .................... 297/232; 297/378.13; 297/248

(58) Field of Classification Search
USPC .................... 297/232, 233, 238, 378.13, 248, 297/378.12; 296/65.09, 65.03
See application file for complete search history.

(56) References Cited

U.S. PATENT DOCUMENTS

| | | | |
|---|---|---|---|
| 5,015,026 A * | 5/1991 | Mouri | 296/65.17 |
| 5,100,204 A | 3/1992 | Makihara et al. | |
| 5,253,924 A | 10/1993 | Glance | |
| 5,671,976 A | 9/1997 | Fredrick | |
| 5,695,243 A * | 12/1997 | Anthony et al. | 297/250.1 |
| 5,782,537 A | 7/1998 | Leistra et al. | |
| 6,010,195 A | 1/2000 | Masters et al. | |
| 6,260,924 B1 * | 7/2001 | Jones et al. | 297/452.18 |
| 6,341,820 B1 * | 1/2002 | Kimura et al. | 297/378.13 |

(Continued)

FOREIGN PATENT DOCUMENTS

DE    19905295 A1    8/1999
DE    102009050839    * 10/2009    .............. B60N 2/64

(Continued)

OTHER PUBLICATIONS

International Search Report dated Sep. 3, 2012 for International Application No. PCT/US2012/038491, International Filing Date May 18, 2012.

(Continued)

*Primary Examiner* — David R Dunn
*Assistant Examiner* — Timothy J Brindley
(74) *Attorney, Agent, or Firm* — Ralph E. Smith

(57) ABSTRACT

A modular seat assembly for installation into one of at least two vehicles differing in body style includes a seat frame including a first attachment area and a second attachment area. The seat assembly also includes a coupling device that operably couples the seat frame to the vehicle. The coupling device is attached to the seat frame in one of the first and second attachment areas. The one of the first and second attachment areas is chosen for attachment of the coupling device according to the body style of the vehicle.

19 Claims, 9 Drawing Sheets

(56) References Cited

U.S. PATENT DOCUMENTS

| | | | |
|---|---|---|---|
| 6,554,365 B2 | 4/2003 | Karschin et al. | |
| 7,255,399 B2 * | 8/2007 | White et al. | 297/378.12 |
| 8,215,695 B2 * | 7/2012 | Ida et al. | 296/65.03 |
| 2012/0261956 A1 * | 10/2012 | Nasshan et al. | 297/232 |

FOREIGN PATENT DOCUMENTS

| | | | |
|---|---|---|---|
| EP | 2135771 | A2 | 12/2009 |
| FR | 2943958 | A1 | 10/2010 |
| FR | 2944486 | A1 | 10/2010 |
| WO | 2008061233 | A2 | 5/2008 |

OTHER PUBLICATIONS

Written Opinion dated Sep. 3, 2012 for International Application No. PCT/US2012/038491, International Filing Date May 18, 2012.

* cited by examiner

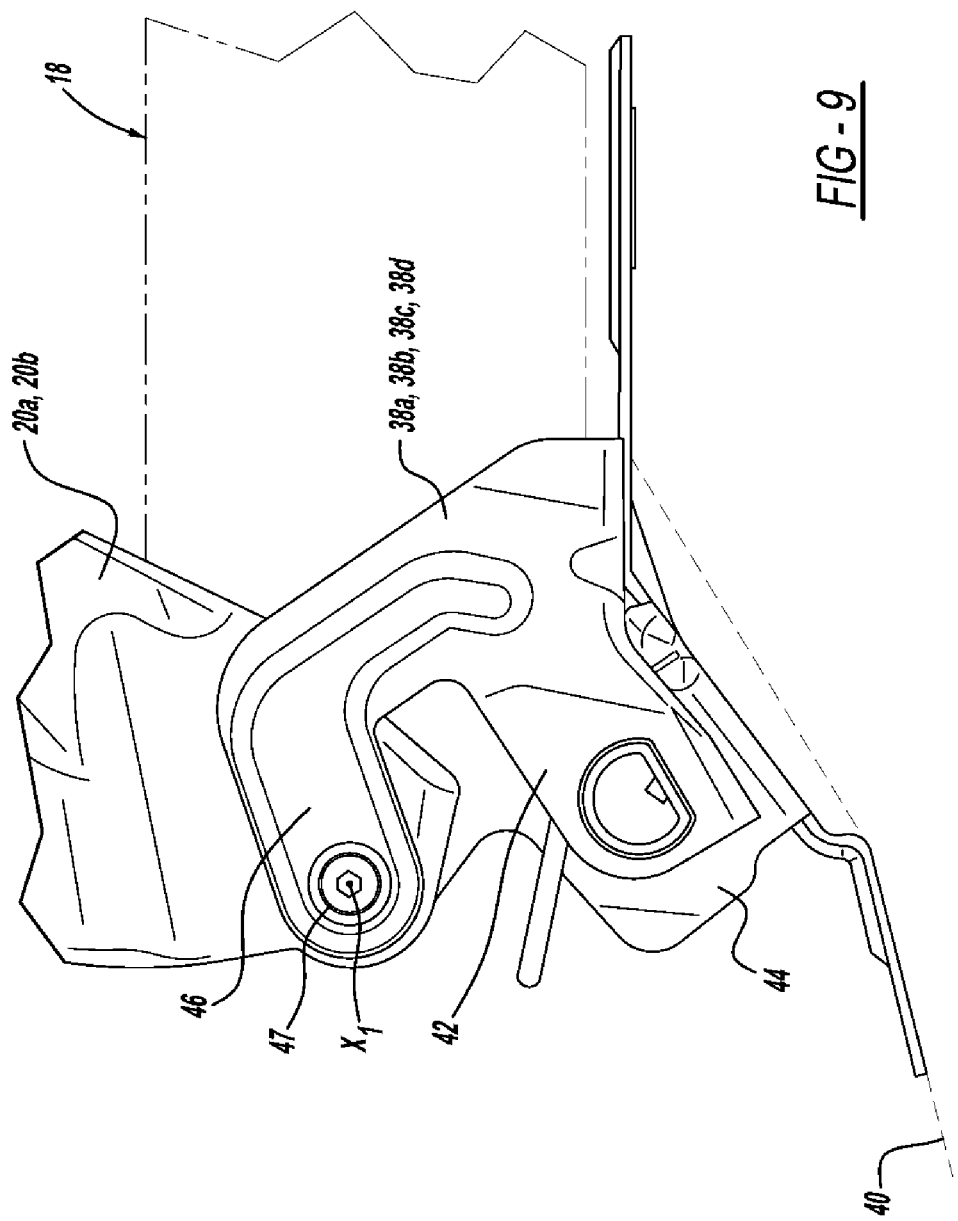

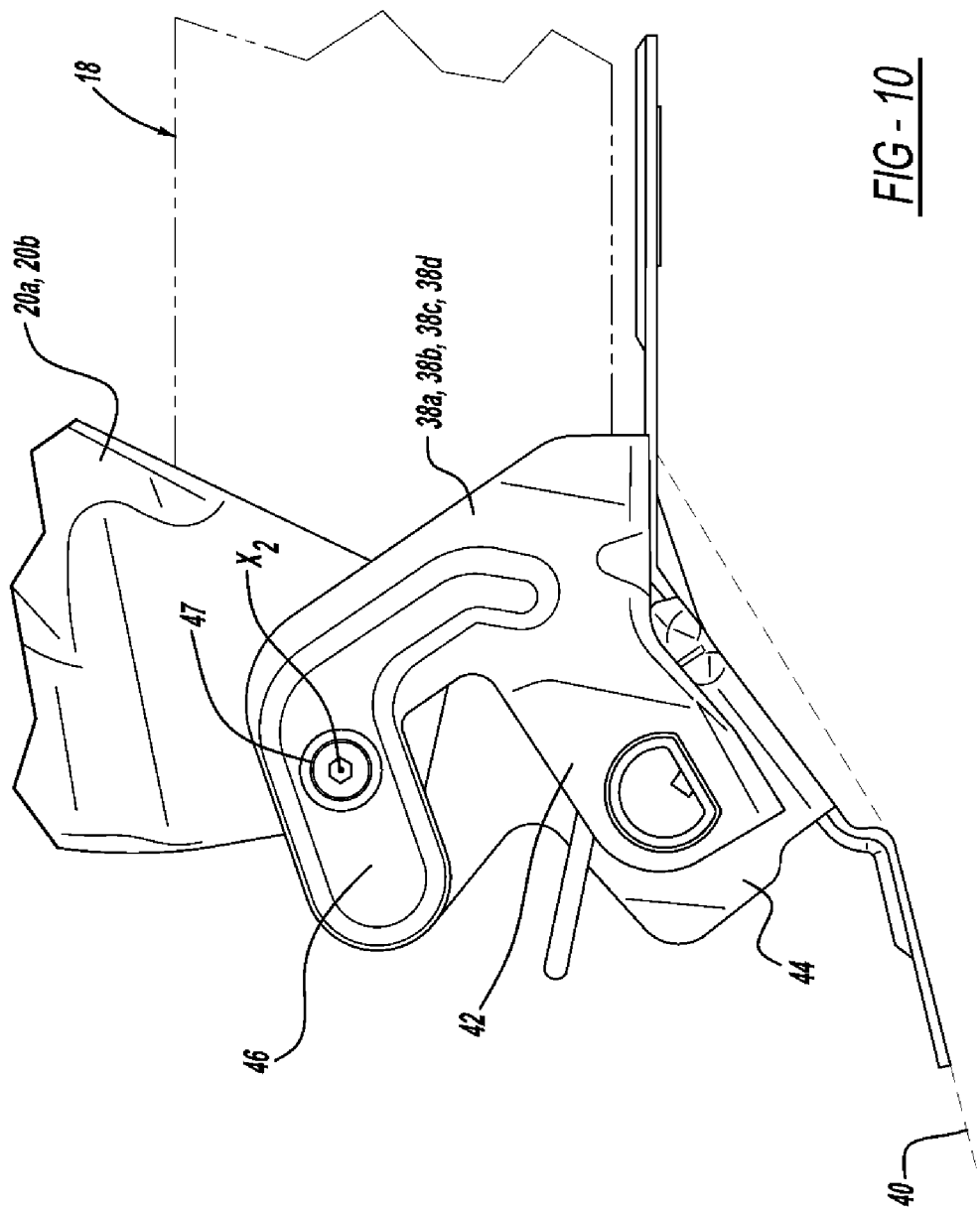

MODULAR SEAT ASSEMBLY FOR A VEHICLE

FIELD

The present invention relates to a vehicle seat assembly and, more particularly, to a modular seat assembly for a vehicle.

BACKGROUND

Seat assemblies are often particularly designed for one specific vehicle body style. As such, a seat assembly that is designed and configured for a sedan can be significantly different from a seat assembly for a hatchback or sports utility vehicle (SUV).

For instance, the size of the seat assembly can vary significantly between these different body styles. This is because the frame of these vehicle body styles can differ greatly, and the seat assembly for each needs to be dimensioned to fit within the respective vehicle frame.

Also, the functions of these seat assemblies can vary between the different body styles, and the configuration of the seat assemblies can differ as a result. For instance, a seat back for a hatchback or SUV body style is often designed to pivot downward relative to its respective seat bottom while the seat back for a sedan is often designed to remain stationary relative to its respective seat bottom. Accordingly, the seat back for the hatchback or SUV body styles can have a different latch, a different latch position, and/or different pivot brackets in comparison with the seat back for the sedan.

Additionally, the structures surrounding the seat assembly can dictate how the corresponding seat assembly is configured. For instance, a sedan often includes a rear shelf to which the seat assembly can be attached. However, the seat back is more exposed in a hatchback or SUV body style; therefore, the seat assembly attaches at an upper, outboard edge.

Accordingly, manufacturing costs can be excessive because different vehicles with different body styles can require different vehicle seat assemblies. More specifically, different tooling and different manufacturing techniques may be necessary to manufacture the different seats. Moreover, the lead time for supplying the parts can be excessive because each of the seats are manufactured differently. In addition, designing the seat assemblies can be inefficient because the seats are designed independent of each other.

SUMMARY

A modular seat assembly for installation into one of at least two vehicles differing in body style is disclosed. The seat assembly includes a seat frame including a first attachment area and a second attachment area. The seat assembly also includes a coupling device that operably couples the seat frame to the vehicle. The coupling device is attached to the seat frame in one of the first and second attachment areas. The one of the first and second attachment areas is chosen for attachment of the coupling device according to the body style of the vehicle.

A method of configuring a modular seat assembly for installation into one of at least two vehicles differing in body style is also disclosed. The method includes providing a seat frame including a first attachment area and a second attachment area. The method also includes attaching a coupling device to a chosen one of the first attachment area and the second attachment area. The coupling device is operable for operably coupling the seat frame to the one of the at least two vehicles. The one of the first and second attachment areas is chosen for attachment of the coupling device according to the body style of the one of the at least two vehicles.

Further areas of applicability of the present disclosure will become apparent from the detailed description, drawings and claims provided hereinafter. It should be understood that the detailed description, including disclosed embodiments and drawings, are merely exemplary in nature and intended for purposes of illustration only, and are not intended to limit the scope of the invention, its application, or use. Thus, variations that do not depart from the gist of the invention are intended to be within the scope of the invention.

BRIEF DESCRIPTION OF THE DRAWINGS

FIG. 9 is a side view of a pivot bracket of the modular seat assembly with a pivot axis in a first location; and FIG. 10 is a side view of the pivot bracket with a pivot axis in a second location.

DETAILED DESCRIPTION

Figure 1A:
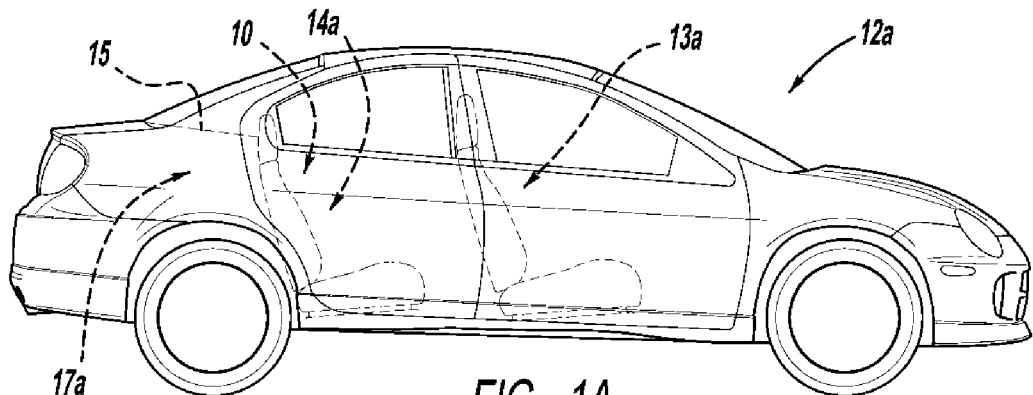
FIGS. 1A-1C are side views of three different vehicles with different body styles.
Figure 1B:
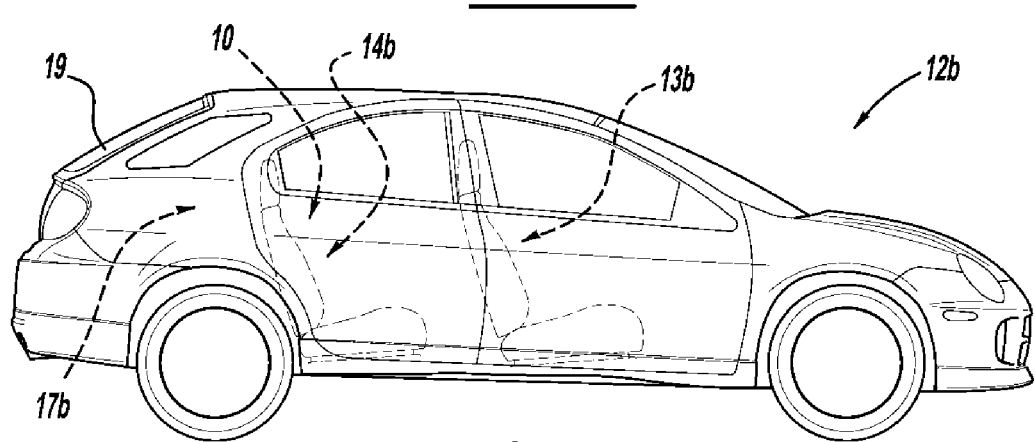
Figure 1C:
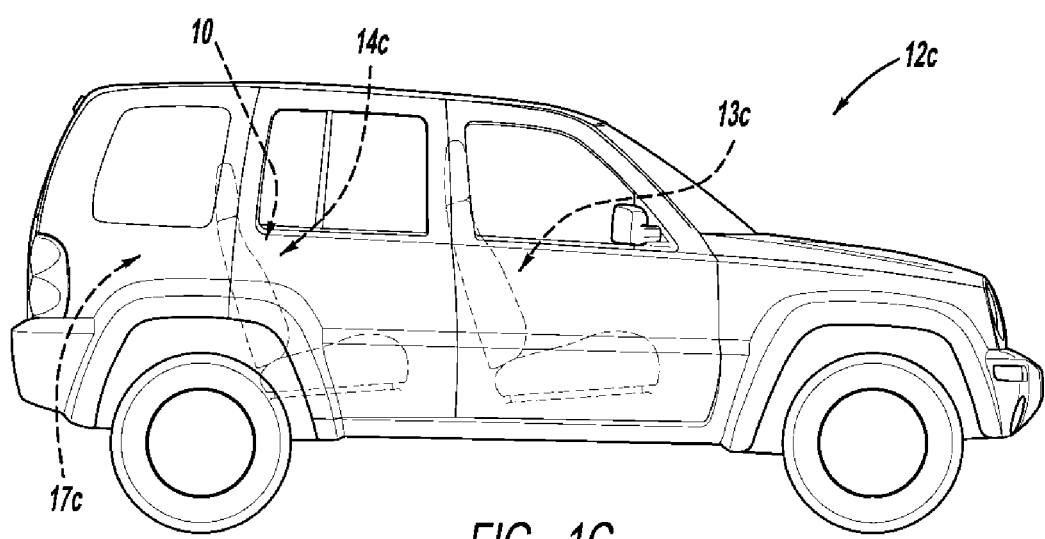
Figure 2:
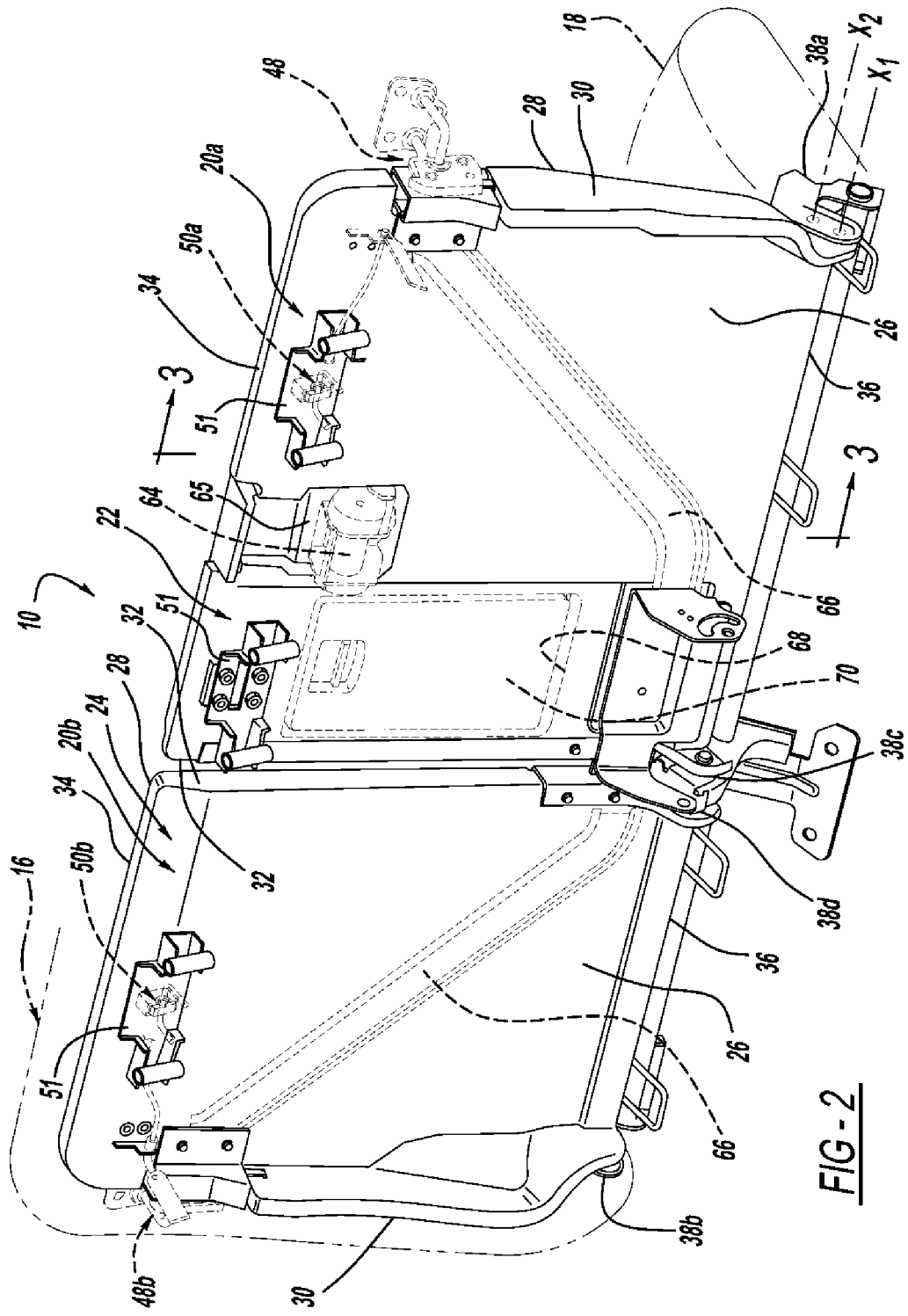
FIG. 2 is a perspective view of a modular seat assembly that is configurable for each of the vehicles of FIGS. 1A-1C.

Referring initially to FIGS. 1A-2, a modular seat assembly 10 is illustrated according to various exemplary embodiments of the present disclosure. As will be discussed, the seat assembly 10 can include various features that can be adapted, configured, and otherwise changed according to various vehicle body styles. In other words, the modular seat assembly 10 can be adapted for use in different vehicles with different body styles.

For instance, the seat assembly 10 can be adapted for use in a vehicle with a sedan-type body style, indicated at 12a in FIG. 1A. The seat assembly 10 can also be modified as discussed below for use in a vehicle with a hatchback-type body style, indicated at 12b in FIG. 1B. The seat assembly 10 can further be adapted for use in a sports utility vehicle-type (SUV-type) body style, indicated at 12c in FIG. 1C. The seat assembly 10 can be further adapted for use in any other suitable vehicle with any other suitable body style.

As shown in FIG. 1A, the sedan-type vehicle 12a can include a front seating row 13a and a rear seating row 14a. The vehicle 12a can also include a rear shelf 15 immediately behind the rear seating row 14a. Thus, a cargo area 17a (i.e., trunk or boot) can be substantially enclosed behind the rear seating row 14a. Also, as shown in FIG. 1A, the seat assembly 10 can be configured for use in the rear seating row 14a.

Also, as shown in FIG. 1B, the hatchback-type vehicle 12b can similarly include a front seating row 13b and a rear seating row 14b. However, the cargo area 17b area behind the rear seating row 14b can be relatively open and exposed because it does not include the shelf 15 of the sedan-type vehicle 12a. Moreover, the hatchback-type vehicle 12b can also include a hatchback 19 that swings open to provide access into the cargo area 17b and that swings closed to enclose the cargo area 17b. Like the sedan-type vehicle 12a, the seat assembly 10 can be configured for use in the rear seating row 14b.

Furthermore, as shown in FIG. 1C, the SUV-type vehicle 12c can be similar to the hatchback-type vehicle 12b so as to include a front seating row 13c and a rear seating row 14c. Also, the cargo area 17c can be relatively open in both the SUV-type vehicle 12c and the hatchback-type vehicle 12b. As before, the seat assembly 10 can be configured for use in the rear seating row 14c.

As stated, the seat assembly 10 can be used in the rear seating row 14a, 14b, 14c of the vehicles 12a, 12b, 12c. In the embodiments shown, the vehicles 12a, 12b, 12c include only two rows of seating, and the seat assembly 10 is incorporated in the second row 14a, 14b, 14c. However, it will be appreciated that the seat assembly 10 can be used in a third row or other rear row of the vehicles 12a, 12b, 12c.

Referring now to FIG. 2, various modular features of the seat assembly 10 will be discussed. These modular features can allow the seat assembly 10 to be adapted and configured for any of the vehicles 12a, 12b, 12c. Other structures of the seat assembly 10 that can be common for each of the vehicles 12a, 12b, 12c will also be discussed.

The seat assembly 10 can include a seat back 16 and a seat bottom 18, each represented in phantom in FIG. 1 (only a portion of seat back 16 is shown for simplicity). The seat bottom 18 can support generally vertical loads (e.g., weight loads) from a passenger, and the seat back 16 can support generally horizontal loads (e.g., inertial loads) from the passenger. Both the seat back 16 and seat bottom 18 can include a foam bun or other type of padding to provide cushioned support to the passenger. The seat back 16 can also include a seat back frame 20a, 20b that provides stiffness and firm support for the loading on the seat back 16. The seat bottom 18 can also include a stiff frame (not shown). The foam or other padding can enclose the seat back frame 20a, 20b and the frame of the seat bottom 18.

As shown in FIG. 2, the seat assembly 10 can have a 60/40 configuration, wherein a first portion 22 of the seat back 16 takes up approximately 60% of the length of the seat assembly 10, and a second portion 24 of the seat back 16 takes up approximately 40% of the length of the seat assembly 10. Thus, the seat back frame 20a of the first portion 22 is longer than the seat back frame 20b of the second portion 24. The different portions 22, 24 of the seat back 16 can be independent of each other as will be discussed. It will be appreciated, also, that the portions 22, 24 can take up any suitable length of the seat assembly 10. Moreover, it will be appreciated that the seat assembly 10 can be substantially monolithic so as to include a single, continuous seat back 16 that spans the vehicle 12a, 12b, 12c instead of including separate portions 22, 24.

Figures 3, 8:
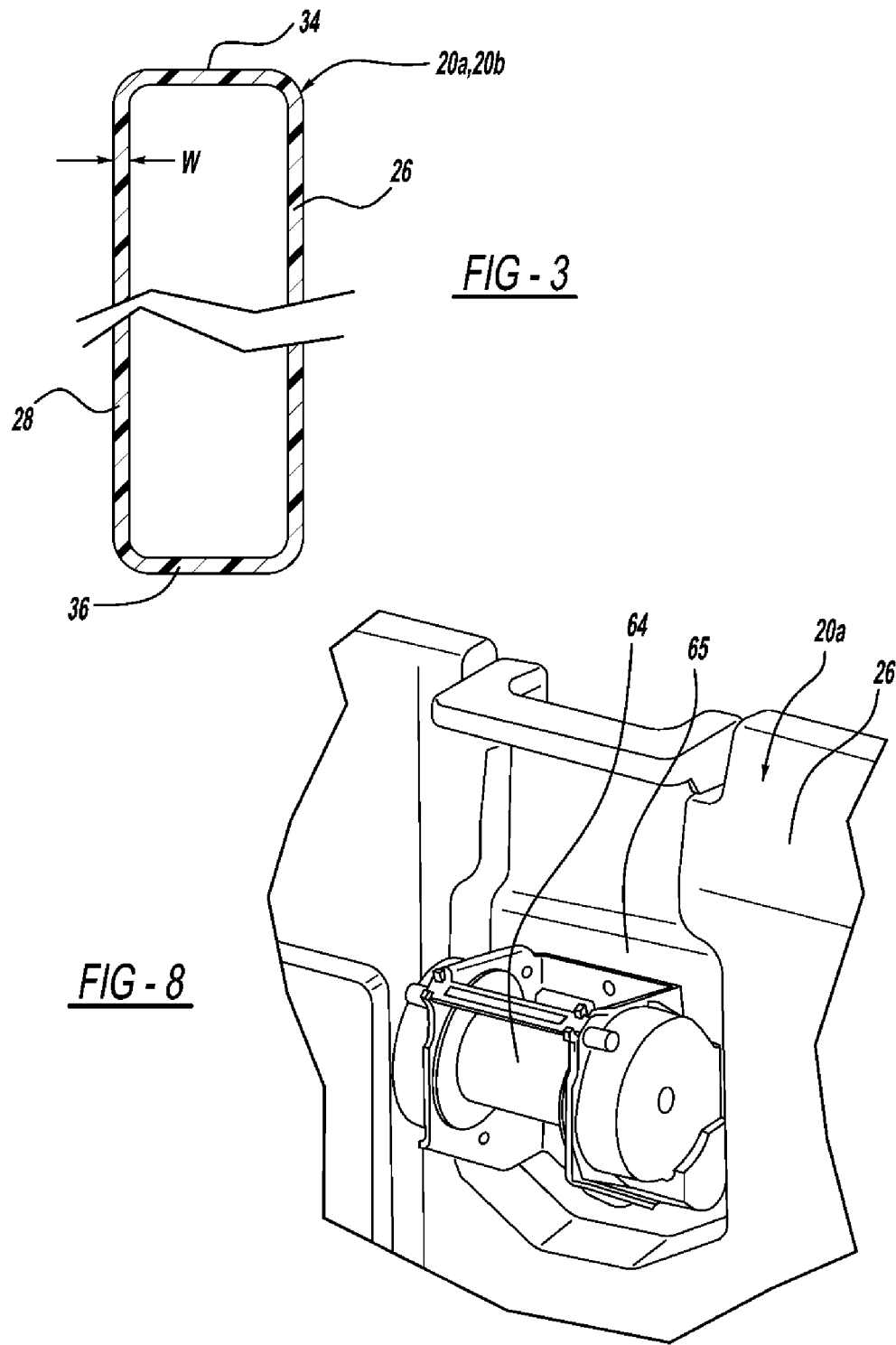
FIG. 3 is a section view of the seat frame of the modular seat assembly taken along line 3-3 of FIG. 2.
FIG. 8 is a perspective view of a seatbelt retractor of the modular seat assembly.

Referring to FIGS. 2 and 3, the seat back frames 20a, 20b will be discussed in greater detail. Each seat back frame 20a, 20b can be a rigid, hollow, monolithic member that is substantially rectangular, with a thin, generally box-like shape. As such, the seat back frames 20a, 20b can each include a rear panel 26, a front panel 28, an outboard side panel 30, an inboard side panel 32, a top side panel 34, and a bottom side panel 36 (FIGS. 1 and 9). The rear and front panels 26, 28 can be substantially flat, or the panels 26, 28 can include one or more elongate ribs that extend between at least two of the side panels 30, 32, 34, 36 to increase the rigidity of the panels 26, 28. The side panels 30, 32, 34, 36 can extend between the rear and front panels 26, 28.

In some embodiments, the seat back frame 20a, 20b can be made out of a polymeric material, such as polycarbonate/acrylonitrile butadiene styrene (PC/ABS), high-density polyethylene (HDPE), polypropylene, or other suitable material. Also, the seat back frame 20a, 20b can be formed by a known blow molding process (i.e., the seat back frame 20a, 20b can be blow-molded). As such, the seat back frame 20a, 20b can be formed from a parison or other pre-formed article, which is made of polymeric material, and which is introduced into a mold (not shown). Gas can be introduced into the parison to force the material against the interior surfaces of the mold into the shape of the seat back frame 20a, 20b.

As shown in FIG. 3, the seat back frame 20a, 20b can be hollow with a predetermined wall thickness W. For example, the wall thickness W can range between two and three mils (0.002 and 0.003 inches). In certain embodiments, the wall thickness may vary over areas to suit rigidity criteria, mounting of other structure, manufacturing concerns and combinations thereof. Thus, the seat back frame 20a, 20b can be manufactured and adapted easily and efficiently. Moreover, as will be discussed, the wall thickness W and the material of the seat back frame 20a, 20b can be adapted according to the particular vehicle 12a, 12b, 12c in which the seat assembly 10 is installed as will be discussed below.

Figure 7:
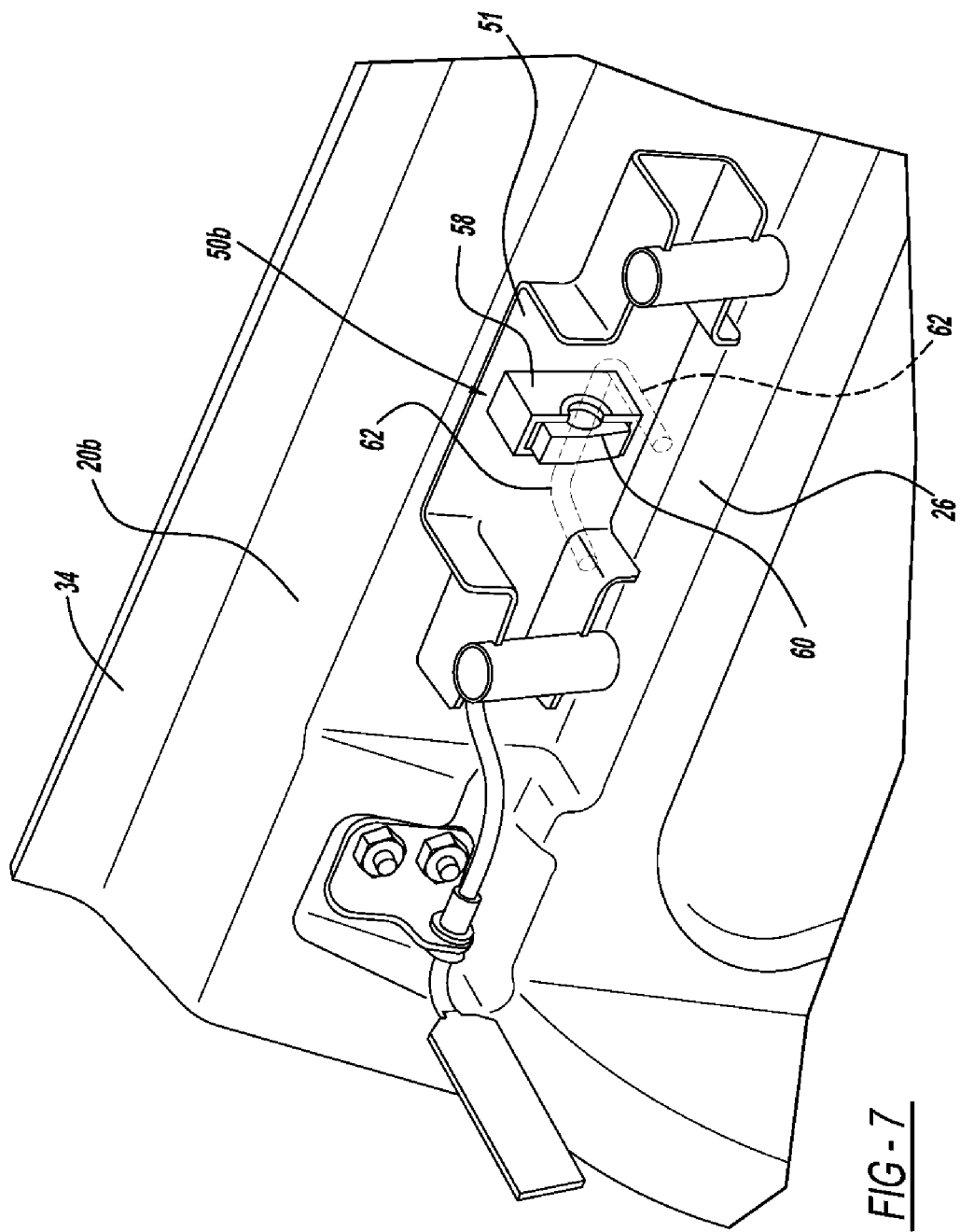
FIG. 7 is a perspective view of a coupling device of the modular seat assembly of FIG. 6.

Referring now to FIGS. 2, 9, and 10 the seat assembly 10 can also include one or more lower coupling devices 38a, 38b, 38c, 38d (e.g. pivot brackets) that operably couple the respective seat back frame 20a, 20b to the floor 40 of the vehicle (shown in phantom in FIGS. 9 and 10). As shown in FIGS. 7 and 8, the lower coupling devices 38a, 38b, 38c, 38d can have an inverted C-shape with a first portion 42 coupled to a bracket 44 that is fixed to the floor 40. The lower coupling devices 38a, 38b, 38c, 38d can also have a second portion 46 that is operably coupled to the respective seat back frame 20a, 20b. More specifically, as shown in FIG. 2, the lower coupling devices 38a, 38b can be operably coupled to an outboard area of the respective seat back frame 20a, 20b, adjacent the outboard side panel 30 and bottom side panel 36. Also, the lower coupling devices 38c, 38d can be operably coupled to an inboard area of the seat back frame 20a, 20b, adjacent the inboard side panel 32 and bottom side panel 36.

In some embodiments, the lower coupling devices 38a, 38b, 38c, 38d can fixedly couple the respective seat back frame 20a, 20b to the floor 40 of the vehicle 12a, 12b, 12c. However, in the embodiments illustrated, the lower coupling devices 38a, 38b, 38c, 38d moveably (e.g., pivotally) couple the respective seat back frame 20a, 20b to the floor 40 of the vehicle 12a, 12b, 12c. As such, the lower coupling devices 38a, 38b, 38c, 38d can define a pivot axes $X_1$, $X_2$ about which the seat back frame 20a, 20b pivots relative to the floor 40. For instance, the second portion 46 of the coupling device 38a, 38b, 38c, 38d can be pivotally coupled to the respective seat back frame 20a, 20b by a pin 47 or another fastener (not shown), and the pivot axes $X_1$, $X_2$ can be defined along the axis of the pin 47 or other fastener. Also, by comparing FIGS. 9 and 10, it is apparent that the pin 47 can extend through the coupling device 38a, 38b, 38c, 38d in one of a variety of locations such that the location of the pivot axes X1, X2 is variable. Specifically in one exemplary embodiment, the location of the pivot axis X1 in FIG. 9 is rearward of the pivot axis X2 in FIG. 10. Thus, as will be discussed, pivot axes $X_1$, $X_2$ can be moved, depending on which vehicle 12a, 12b, 12c in which the seat assembly 10 is installed.

Referring back to FIG. 2, the seat assembly 10 can include either a first upper coupling device 48a, 48b or a second upper coupling device 50a, 50b (each shown in phantom in FIG. 2), which attach the respective seat back frame 20a, 20b to the vehicle 12a, 12b, 12c. Configurations of the seat assembly 10 with the first upper coupling devices 48a, 48b are shown in FIGS. 4 and 5, and configurations of the seat assembly 10 with the second upper coupling devices 50a, 50b are shown in FIGS. 6 and 7.

Figure 4:
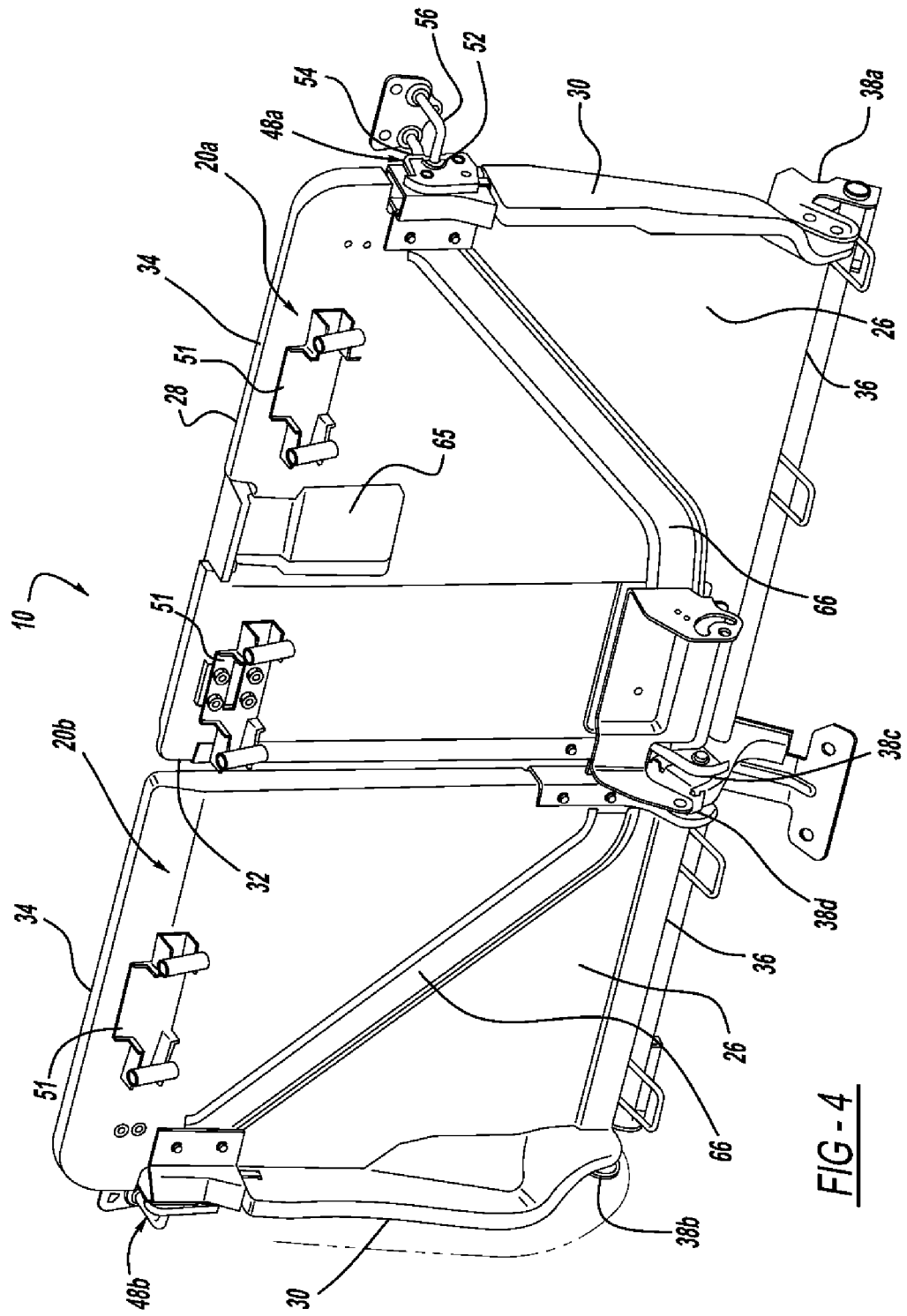
FIG. 4 is a perspective view of the modular seat assembly configured for the vehicles of FIGS. 1B and 1C.
Figure 5:
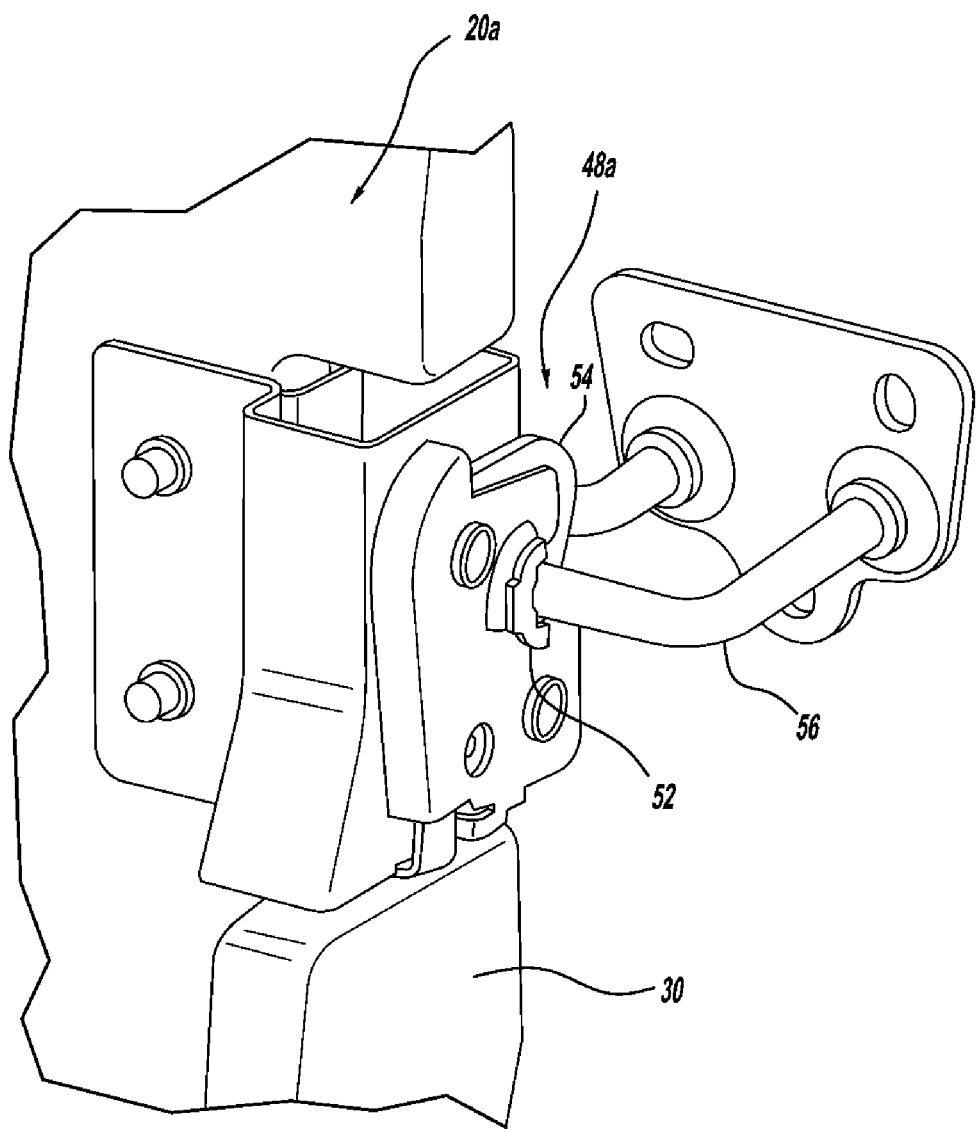
FIG. 5 is a perspective view of a coupling device of the modular seat assembly of FIG. 4.

In some embodiments, the seat assembly 10 can include first upper coupling devices 48a, 48b if installed in a hatchback-style vehicle 12b or SUV-style vehicle 12c (see FIGS. 4 and 5). Alternatively, the seat assembly 10 can include second upper coupling devices 50a, 50b if installed in a sedan-style vehicle 12a (see FIGS. 6 and 7). Thus, the seat assembly 10 can be highly adaptable and modular for use in a variety of vehicles 12a, 12b, 12c.

Referring to FIGS. 4 and 5, the first upper coupling device 48a, 48b will be described in greater detail. (Only one of the first upper coupling devices 48a is shown in FIG. 5; however, it will be appreciated that the first upper coupling devices 48a can be substantially similar.) As shown, the device 48a, 48b can include a base plate 52 that is fixed to an outboard area of the respective seat frame 20a, 20b, adjacent the outboard side panel 30 and top side panel 34. The first upper coupling device 48a, 48b can also include a moveable latch 54 or hook that is moveably (e.g., pivotally) attached to the base plate 52. As shown in FIG. 5, a U-shaped striker bar 56 of the vehicle frame can be enclosed between the latch 54 and the base plate 52 to thereby removably attach the seat frame 20a, 20b to the frame of the vehicle 12a, 12b, 12c. Also, the seat assembly 10 can include a release member, such as a strap (not shown), that can be used to actuate the latch 54 and allow the striker bar 56 to move away from the coupling device 48a, 48b. It will be appreciated, however, that the coupling device 48a, 48b can be configured to be permanently fixed to the frame of the vehicle 12a, 12b, 12c.

Figure 6:
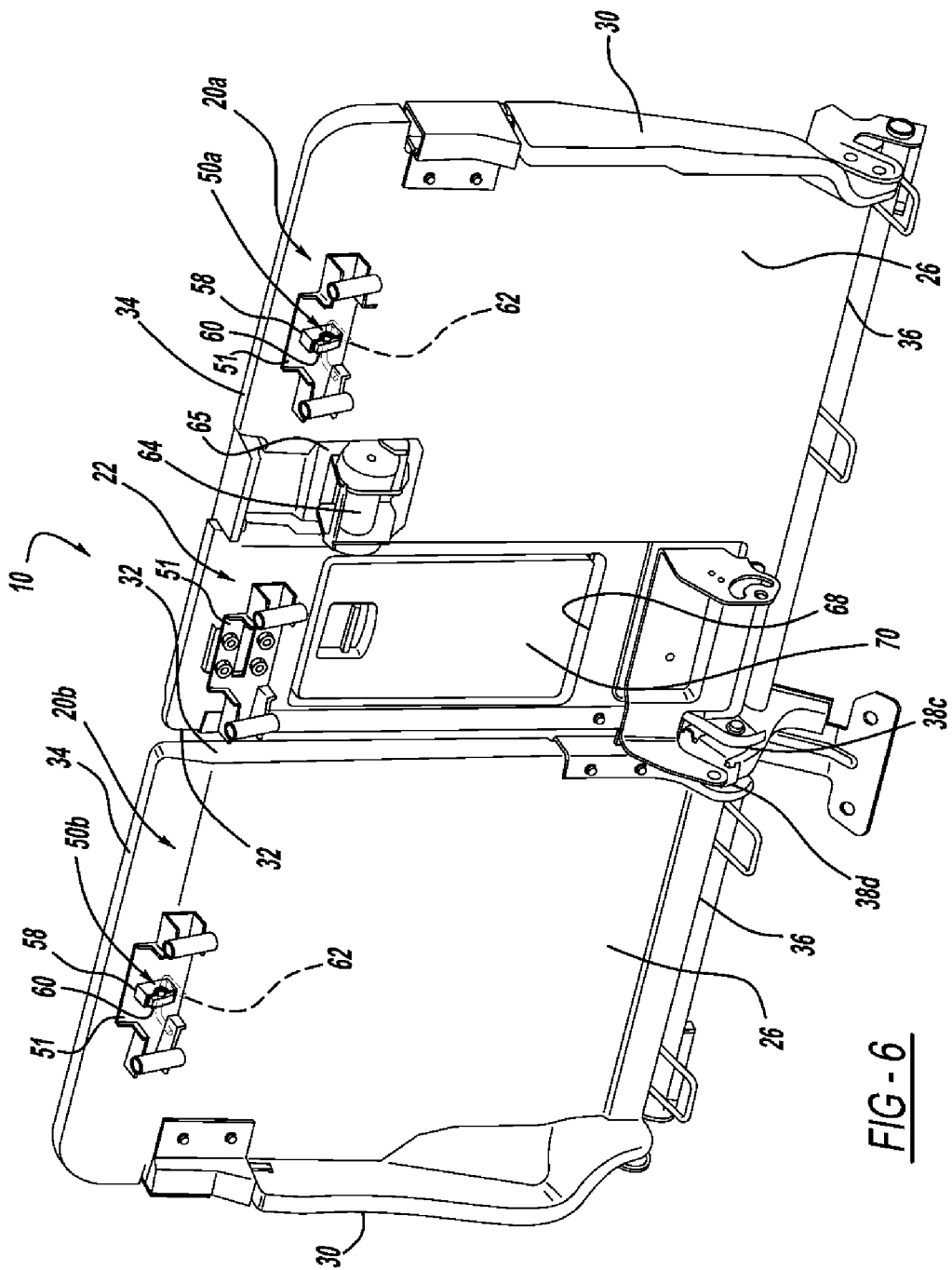
FIG. 6 is a perspective view of the modular seat assembly configured for the vehicle of FIG. 1A.

Referring now to FIGS. 6 and 7, the second upper coupling device 50a, 50b will be described in greater detail. (Although only one of the coupling devices 50b is shown in FIG. 7, it will be appreciated that each of the coupling devices 50a, 50b can be substantially similar.) As shown, the device 50a, 50b can include a base plate 58 and a moveable latch 60, similar to the first upper coupling device 48a, 48b described above. However, the base plate 58 is fixed to an inboard area of the respective seat frame 20a, 20b, on the rear panel 26, adjacent the top side panel 34, and spaced apart from both the outboard side panel 30 and the inboard side panel 32. In some embodiments, the base plate 58 can be fixed directly to a headrest base member 51, which is fixed directly to the rear panel 26 of the seat frame 20a, 20b. Accordingly, the second upper coupling device 50a, 50b can removably couple to a striker bar 62 (shown in phantom) that extends from an underside of the shelf 15 (FIG. 1A) of the vehicle 12a. In other embodiments, the second upper coupling device 50a, 50b can be configured to fixedly or permanently couple to the shelf 15 of the vehicle 12a, 12b, 12c.

Referring back to FIGS. 2, 6, and 8, additional components of the seat assembly 10 will be discussed. For instance, the seat assembly 10 can include a seat belt retractor 64. The seat belt retractor 64 can be of a known type for spooling of a seat belt (not shown). The seat belt retractor 64 can be fixed to the rear panel 26 of the seat back frame 20a. More specifically, as shown in FIGS. 6 and 8, the rear panel 26 can include a recess 65 that is adjacent the top side panel 34 and spaced between the inboard and outboard side panels 30, 32, and the seat belt retractor 64 can be fixed to the rear panel 26 within the recess 65. As will be discussed, the seat belt retractor 64 can be an optional component of the seat assembly 10. In other embodiments (e.g., the embodiments of FIG. 4), the seat belt retractor 64 is not included on the seat assembly 10 and is fixed elsewhere (e.g., directly to the vehicle frame). Accordingly, the seat assembly 10 can be configured with or without the seat-mounted seat belt retractor 64.

Also, as shown in FIGS. 2 and 4, the seat assembly 10 can include a reinforcement bracket 66. The reinforcement bracket 66 can be an elongate, relatively stiff member. In some embodiments, the bracket 66 can be made of metal. Also, the reinforcement bracket 66 can be fixed at one end to the respective first upper coupling device 48a, 48b and at the opposite end to the respective inboard lower coupling device 38c, 38d. Also, in some embodiments, the reinforcement bracket 66 can include a branch (not shown) that is additionally fixed to the frame 20a, 20b adjacent to the seat belt retractor 64. It will be appreciated that the reinforcement bracket 66 can extend across any portion of the seat frame 20a, 20b. As such, the reinforcement bracket 66 can reinforce and provide added stiffness and strength to the seat back frame 20a, 20b. However, the reinforcement bracket 66 can be an optional component and may or may not be included on the seat assembly 10 as discussed in greater detail below.

Furthermore, as shown in FIGS. 2 and 6, the seat assembly 10 can optionally include a pass-through opening 68. As shown in FIG. 6, the pass-through opening 68 can be a rectangular opening through both the front and rear panels 26, 28 of the frame 20a. More specifically, the opening 68 can be defined in an area adjacent the inboard side panel 32 of the frame 20a. The seat assembly 10 can also include a removable cover or door 70. The pass-through opening 68 can provide access through the seat assembly 10 and into the cargo area 17a (FIG. 1A) of the vehicle 12a. In other vehicles 12b, 12c, there is ample access to the cargo area 17b, 17c; therefore, the pass-through opening 68 is unnecessary and is not included (see FIG. 4). It will be appreciated that the frame 20a can be manufactured largely in the same fashion with only minor tooling modifications regardless of whether the pass-through opening 68 is included or not.

Referring now to FIGS. 4-8, different configurations of the seat assembly 10 will be discussed. FIGS. 4 and 5 can represent a configuration for a hatchback-style or SUV-style vehicle 12b, 12c, whereas FIGS. 6-8 can represent a configuration for a sedan-style vehicle 12a. However, it will be appreciated that the seat assembly 10 can be configured in a variety of other ways without departing from the scope of the present disclosure.

As shown in FIGS. 4 and 5, the seat assembly 10 can be configured to include the first upper coupling devices 48a, 48b, whereas the seat assembly of FIGS. 6 and 7 includes the second upper coupling devices 50a, 50b. Thus, the outboard attachment area of the first upper coupling devices 48a, 48b can be useful for attaching the seat back frames 20a, 20b directly to the frame of the vehicle 12b, 12c (e.g., to a pillar of the vehicle frame). On the other hand, the inboard attachment area of the second upper coupling devices 50a, 50b can be useful for attaching the seat back frames 20a, 20b within the sedan-style vehicle 12a because the rear shelf 15 (FIG. 1A) is included. Regardless, the seat assembly 10 can be easily modified for use in any of these vehicles 12a, 12b, 12c or any other suitable vehicle.

Moreover, as shown in FIG. 4, the seat assembly 10 can include the reinforcement brackets 66 while the seat assembly 10 of FIG. 6 does not. The seat assembly 10 of FIG. 4 can be configured with the brackets 66 because the strength and stiffness requirements of the seat assembly 10 may be higher than those of the seat assembly 10 of FIG. 6. Also, the loading behavior (e.g., as determined by finite element analysis, etc.) of the seat assembly 10 of FIG. 4 may be different from that of FIG. 6. Based on this data, it can be determined that the brackets 66 are necessary for the seat assembly 10 of FIG. 4 and are unnecessary for the seat assembly 10 of FIG. 6.

Also, as shown in FIGS. 6 and 8, the seat assembly 10 includes the seat belt retractor 64, whereas the seat assembly 10 of FIG. 4 does not include the seat belt retractor 64. Specifically, in the case of the hatchback-style vehicle 12b and the SUV-style vehicle 12c, a seat-mounted seat belt is more likely to block access to the cargo area 17b, 17c; therefore, the seat belt retractor 64 is not included and can be included on the vehicle frame or elsewhere. In comparison, in the sedan-type vehicle 12a, the seat belt retractor 64 can be conveniently mounted to the seat assembly 10.

Additionally, as shown in FIG. 6, the pass-through opening 68 and cover 70 is included on the seat assembly 10, whereas the seat assembly 10 of FIG. 4 does not include the opening 68 or cover 70. Specifically, the cargo area 17b, 17c of the hatchback-style vehicle 12b and SUV-style vehicle 12c can remain open and accessible; therefore, the pass-through opening 68 and cover 70 can be unnecessary. In comparison, the cargo area 17a of the sedan-style vehicle 12a can be more enclosed, and the pass-through opening 68 and cover 70 can be more necessary.

Still further, by comparing FIGS. 9 and 10, it can be seen that the same lower coupling device 38a, 38b, 38c, 38d can define a plurality of potential pivot axes X1, X2. In the configuration of FIG. 9, the pivot axis X1 can be located directly adjacent the terminal end of the second portion 46 of the coupling device 38a, 38b, 38c, 38d, whereas in the configuration of FIG. 10, the pivot axis X2 can be located on a midpoint of the second portion 46 of the coupling device 38a, 38b, 38c, 38d. The coupling devices 38a, 38b, 38c, 38d can be substantially identical for all of the vehicles 12a, 12b, 12c, but the axes X1, X2 can be defined differently for each (i.e., the holes for the pin 47 can be punched in different locations for each). Thus, the tooling and manufacturing of the coupling devices 38a, 38b, 38c, 38d can be substantially similar for each of the vehicles 12a, 12b, 12c, thereby providing additional efficiencies. It will be appreciated that the location of the axis X1, X2 relative to the seat frame 20a, 20b can be chosen according to the particular seat bottom 18 and/or the geometry of the floor 40 of the vehicle 12a, 12b, 12c such that the seat back frame 20a, 20b can pivot without interfering with the seat bottom 18 and/or the floor 40 of the vehicle 12a, 12b, 12c.

Still further, as stated above, the seat back frame 20a, 20b can be blow molded. This feature can provide added adaptability of the seat assembly 10. For instance, it will be appreciated that the wall thickness W (FIG. 3) of the seat back frame 20a, 20b can be adapted by changing the blow molding process in relatively minor ways. Specifically, the amount of material in the blow molding parison can be changed to thereby change the wall thickness W of the frame 20a, 20b. Also, the pressure of the air injected into the blow mold can be altered to change the wall thickness W. The wall thickness W can be altered in other ways as well without departing from the scope of the present disclosure.

Also, the wall thickness W can be adapted according to various criteria. In some embodiments, the wall thickness W can be increased such that the seat back frame 20a, 20b has higher strength and rigidity, and the wall thickness W can be decreased such that the material costs of the frame 20a, 20b are lower. It will be appreciated that the wall thickness W can be adapted depending on whether the seat assembly 10 is intended for the sedan-type vehicle 12a, the hatchback-type vehicle 12b, or the SUV-type vehicle 12c. For instance, the hatchback-type vehicle 12b and SUV-type vehicle 12c may require stiffer seat assemblies 10 than those of the sedan-type vehicle 12a. Therefore, the wall thickness W can be thicker in the hatchback-type vehicle 12b and the SUV-type vehicle 12c. Accordingly, the blown seat back frame 20a, 20b can be modified easily, without having to drastically modify the associated molds, tools, or manufacturing processes for making the frame 20a, 20b.

Also, the material of the seat back frame 20a, 20b can be modified as well. It will be appreciated that the chosen material can affect the strength and other characteristics of the seat back frame 20a, 20b; therefore, the material of the seat back frame 20a, 20b can vary according to the vehicle 12a, 12b, 12c for which it is intended.

Accordingly, the modular seat assembly 10 of the present disclosure can be modified in a number of ways for use in a number of different vehicles 12a, 12b, 12c, each with different body styles. These modifications can be made in a very efficient manner. For instance, tooling can be largely the same for producing the seat assembly 10 for each of the vehicles 12a, 12b, 12c. Also, seating design can be completed more efficiently. Additionally, the lead time for parts can be significantly reduced. Moreover, the seat assembly 10 can be relatively lightweight, especially if the seat frame 20a, 20b is made out of a polymeric material.

What is claimed is:

1. A system comprising:
a first vehicle including a pair of first coupling devices and a first body style having an enclosed cargo area, the first coupling devices having a first spacing between each other;
a second vehicle including a pair of second coupling devices and a second body style having an open cargo area, the second body style being different from the first body style, the second coupling devices having a second spacing between each other that is different from the first spacing;
a seat frame including a pair of first attachment areas and a pair of second attachment areas, the seat frame adapted to be interchangeably installed into the first vehicle and into the second vehicle without modifying a configuration of the seat frame, the first coupling devices are engaged with the first attachment areas when the seat frame is installed into the first vehicle, the second coupling devices are engaged with the second attachment areas when the seat frame is installed into the second vehicle; and
a seat belt retractor that is coupled to the seat frame in only one of the first and second vehicles.

2. The system of claim 1, further comprising a pivot bracket that is operably coupled to the seat frame, the pivot bracket including a first pivot area and a second pivot area, a pivot axis of the seat frame being defined in one of the first and second pivot areas, the first pivot area corresponding to the first body style, the second pivot area corresponding to the second body style.

3. A system comprising:
a first vehicle including a pair of first coupling devices and a first body style having an enclosed cargo area, the first coupling devices having a first spacing between each other;
a second vehicle including a pair of second coupling devices and a second body style having an open cargo area, the second body style being different from the first body style, the second coupling devices having a second spacing between each other that is different from the first spacing; and a seat frame including a pair of first attachment areas and a pair of second attachment areas, the seat frame adapted to be interchangeably installed into the first vehicle and into the second vehicle without modifying a configuration of the seat frame, the first coupling devices are engaged with the first attachment areas when the seat frame is installed into the first vehicle, the second coupling devices are engaged with the second attachment areas when the seat frame is installed into the second vehicle, wherein the seat frame includes a rear panel and outboard side panels, wherein the first attachment areas are located on the outboard side panels, and wherein the second attachment areas are located on an inboard area of the rear panel.

4. The system of claim 3, further comprising a pivot bracket that is operably coupled to the seat frame, the pivot bracket including a first pivot area and a second pivot area, a pivot axis of the seat frame being defined in one of the first and second pivot areas, the first pivot area corresponding to the first body style, the second pivot area corresponding to the second body style.

5. A method of configuring a modular seat assembly for installation into either of first and second vehicles, the method comprising:
providing a seat frame including a first attachment area and a second attachment area, the seat frame being able to be installed into the first vehicle and able to be installed into the second vehicle without modifying the configuration of the seat frame, the first vehicle having a first body style, the second vehicle having a second body style that is different from the first body style;
selecting one of the first and second vehicles for installation of the seat frame therein;
selecting one of the first and second attachment areas of the seat frame based on the body style of the selected one of the first and second vehicles;
coupling the selected one of the first and second attachment areas to a coupling device mounted in the selected one of the first and second vehicles; and
adapting a pivot bracket of the seat assembly to define a pivot axis in a location according to the body style of the selected one of the first and second vehicles.

6. The method of claim 5, wherein the first and second body styles of the first and second vehicles include two of a sedan, a hatchback, and a sports utility vehicle.

7. The method of claim 5, wherein the first attachment area is located on an outboard area of the seat frame, and the second attachment area is located on an inboard area of the seat frame.

8. The method of claim 7, wherein attaching the coupling device to the first attachment area occurs when the seat assembly is for at least one of a hatchback and a sports utility vehicle, and wherein attaching the coupling device to the second attachment area occurs when the seat assembly is for a sedan.

9. The method of claim 5, further comprising installing the seat assembly into a rear seating row of the selected one of the first and second vehicles.

10. The method of claim 5, wherein the first vehicle includes an open cargo area, and wherein the second vehicle includes an enclosed cargo area.

11. A system comprising:
a first vehicle including a pair of first coupling devices and a first body style having an enclosed cargo area, the first coupling devices having a first spacing between each other;
a second vehicle including a pair of second coupling devices and a second body style having an open cargo area, the second body style being different from the first body style, the second coupling devices having a second spacing between each other that is different from the first spacing;
a seat frame including a pair of first attachment areas and a pair of second attachment areas, the seat frame adapted to be interchangeably installed into the first vehicle and into the second vehicle without modifying a configuration of the seat frame, the first coupling devices are engaged with the first attachment areas when the seat frame is installed into the first vehicle, the second coupling devices are engaged with the second attachment areas when the seat frame is installed into the second vehicle; and
a pivot bracket that is operably coupled to the seat frame, the pivot bracket including a first pivot area and a second pivot area, a pivot axis of the seat frame being defined in one of the first and second pivot areas, the first pivot area corresponding to the first body style, the second pivot area corresponding to the second body style.

12. The system of claim 11, wherein the first and second coupling devices are configured to removably couple the seat frame to the one of the first and second vehicles.

13. The system of claim 11, further comprising a reinforcement bracket that is operably coupled to the seat frame and that reinforces the seat frame in only one of the first and second vehicles.

14. The system of claim 11, wherein the seat frame includes a pass-through opening in only one of the first and second vehicles.

15. The system of claim 11, wherein the seat frame is made from a blow-molded, polymeric material.

16. The system of claim 15, wherein a wall thickness of the seat frame is between approximately 0.002 and 0.003 mils.

17. The system of claim 11, wherein the first and second body styles of the first and second vehicles include at least two of a sedan, a hatchback, and a sports utility vehicle.

18. The system of claim 11, wherein the first attachment areas are located on outboard areas of the seat frame, and the second attachment areas are located on inboard areas of the seat frame.

19. The system of claim 11, wherein the seat frame is a part of a rear row seat assembly of the one of the first and second vehicles.

* * * * *